US009020219B2

(12) United States Patent
Yagi et al.

(10) Patent No.: US 9,020,219 B2
(45) Date of Patent: Apr. 28, 2015

(54) MEDICAL IMAGE PROCESSING APPARATUS (75) Inventors: Minoru Yagi, Otawara (JP); Shinya Sugiyama, Nasushiobara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 170 days.

(21) Appl. No.: 13/458,005

(22) Filed: Apr. 27, 2012

(65) Prior Publication Data
US 2012/0281893 A1 Nov. 8, 2012

(30) Foreign Application Priority Data

May 6, 2011 (JP) ................ P2011-103812

(51) Int. Cl.
G06K 9/00 (2006.01)
H04N 13/00 (2006.01)

(52) U.S. Cl.
CPC ......... H04N 13/007 (2013.01); H04N 13/0014 (2013.01); H04N 13/004 (2013.01)

(58) Field of Classification Search
None
See application file for complete search history.

(56) References Cited

U.S. PATENT DOCUMENTS

| 2005/0264559 A1 | 12/2005 | Vesely et al. |
| 2007/0005045 A1* | 1/2007 | Mintz et al. .................. 606/1 |
| 2009/0010519 A1 | 1/2009 | Wakai et al. |
| 2010/0265315 A1 | 10/2010 | Okuda et al. |

FOREIGN PATENT DOCUMENTS

| EP | 1 953 702 A2 | 8/2008 |
| EP | 1 953 702 A3 | 8/2008 |
| JP | 2003-263102 | 9/2003 |
| JP | 2007-052304 | 3/2007 |
| JP | 2008-083600 | 4/2008 |
| JP | 2009-28515 | 2/2009 |
| JP | 2010-273333 A | 12/2010 |

(Continued)

OTHER PUBLICATIONS

Extended European Search Report issued Aug. 19, 2013 in Patent Application No. 12166850.3.
Combined Chinese Office Action and Search Report issued Feb. 8, 2014 in Patent Application No. 201210136762.5 with English Translation of Category of Cited Documents.

(Continued)

Primary Examiner — Atiba O Fitzpatrick
(74) Attorney, Agent, or Firm — Oblon, McClelland, Maier & Neustadt, L.L.P.

(57) ABSTRACT

According to one embodiment, a medical image processing apparatus includes at least a parallax image generation unit and a display unit. The parallax image generation unit generates combined data of a three-dimensional medical image data and a text information, and generates a plurality of parallax image data by performing projection processing on the combined data along a corresponding plurality of parallax directions. The display unit displays a plurality of parallax images, based on the plurality of parallax image data, in the corresponding plurality of parallax directions such that a three-dimensional medical image based on the three-dimensional medical image data and a text plane based on the text information are perceived stereoscopically viewable by an observer. The parallax image generation unit changes orientation of a display region for the text information in generating the combined data according to each of the parallax directions.

6 Claims, 11 Drawing Sheets (56) References Cited

FOREIGN PATENT DOCUMENTS

| | | |
|---|---|---|
| JP | 2012-518314 A | 8/2012 |
| WO | WO 2008/122838 A1 | 10/2008 |
| WO | WO 2010/095074 A1 | 8/2010 |
| WO | WO 2010/095074 A9 | 8/2010 |
| WO | WO 2010/151555 A1 | 12/2010 |

OTHER PUBLICATIONS

Tetsuya Fujii, et al.; "A Navigation Support System for Neurosurgical Planning in Virtualized Human Head by Using Character Information"; Jan. 25, 2000, vol. J83-D-II No. 1, p. 362-368. (with English translation of pertinent portions).

Office Action issued Jan. 27, 2015 in Japanese Patent Application No. 2011-103812.

* cited by examiner

MEDICAL IMAGE PROCESSING APPARATUS

CROSS-REFERENCE TO RELATED APPLICATIONS

This application claims the benefit of priority of Japanese Patent Application No. 2011-103812, filed May 6, 2011, the entire contents of which are incorporated herein by reference.

FIELD

Embodiments described herein relate generally to a medical image processing apparatus.

BACKGROUND

There is known a volume rendering (VR) technique, i.e., a process of reconstructing a medical image taken by an image diagnostic apparatus into volume image data and displaying the volume image data as a 2D image on a monitor. Display of such a volume image as a 3D image is also contemplated for giving a real sense of depth to the volume image. It is expected that display of a medical image as a 3D image is applied to various situations, such as a conference before a surgical operation, a simulation of an operation plan, and intra-operative navigation.

A monitor which allows stereoscopic viewing of two parallax images (binocular parallax images) taken from two viewpoints with use of dedicated equipment, such as glasses for stereoscopic vision, has been in practical use. Additionally, a monitor which allows naked eyes to stereoscopically view multiple parallax images (e.g., nine parallax images) taken from a plurality of viewpoints with use of a light direction controller such as a lenticular lens has recently come into practical use. Note that two parallax images or nine parallax images displayed by a monitor allowing stereoscopic viewing may be generated by estimating depth information of an image taken from one viewing point and performing image processing with use of the estimated information.

Recently-commercialized monitors which allow stereoscopic viewing include an apparatus that employs a light direction controller such as a lenticular lens, which allows an observer to stereoscopically view multiple parallax images (e.g., nine parallax images) by naked eyes. Such a stereoscopic display apparatus is an apparatus which allows stereoscopic viewing with binocular parallax and also allows stereoscopic viewing with motion parallax that refers to a change in observed picture with movement of a viewpoint of an observer.

Use of a naked-eye 3D monitor allowing stereoscopic viewing by naked eyes for medical use eliminates a need for annoying glasses, e.g., even during surgery. When a naked-eye 3D monitor is used for medical use, a plurality of people may simultaneously and stereoscopically view a medical image. In particular, during surgery, a plurality of people view a naked-eye 3D monitor from different directions. For this reason, there have been developed techniques for a naked-eye 3D monitor which allow stereoscopic viewing regardless of from what angle the monitor is viewed.

It commonly happens that a medical image and an examination report are simultaneously displayed on a screen and that a doctor enters findings made through a diagnosis using the medical image into the examination report. In this case, if the medical image is displayed as a 3D image, the 3D display facilitates visual recognition of an antero-posterior positional relationship hard to be determined in two dimensions and discovery of a lesion.

However, text information such as an examination report is two-dimensional information. To display an examination report simultaneously with a medical image being displayed as a 3D image, another two-dimensional monitor has been used to display the examination report. Although a 3D monitor can display two-dimensional text information, if an eye direction changes in a lateral direction, the text information looks oblique and is hard to see.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6A is a diagram showing an example in which a text plane is farther than a display plane for a three-dimensional medical image;

FIG. 6B is a diagram showing an example in which the text plane is created on a plane close to the display plane for the three-dimensional medical image;

DETAILED DESCRIPTION

In general, according to one embodiment, a medical image processing apparatus includes an image storage unit, a text information storage unit, a parallax image generation unit and a display unit. The image storage unit stores three-dimensional medical image data. The text information storage unit stores text information corresponding to the three-dimensional medical image data stored in the image storage unit. The parallax image generation unit generates combined data of the three-dimensional medical image data and the text information, and generates a plurality of parallax image data by performing projection processing on the combined data along a corresponding plurality of parallax directions. The display unit displays a plurality of parallax images, based on the plurality of parallax image data, in the corresponding plurality of parallax directions such that a three-dimensional medical image based on the three-dimensional medical image data and a text plane based on the text information are perceived stereoscopically viewable by an observer. The parallax image generation unit changes orientation of a display region for the text information in generating the combined data according to each of the parallax directions.

Hereinbelow, a description will be given of a medical image processing apparatus according to an embodiment of the present invention with reference to the drawings.

Figure 1:
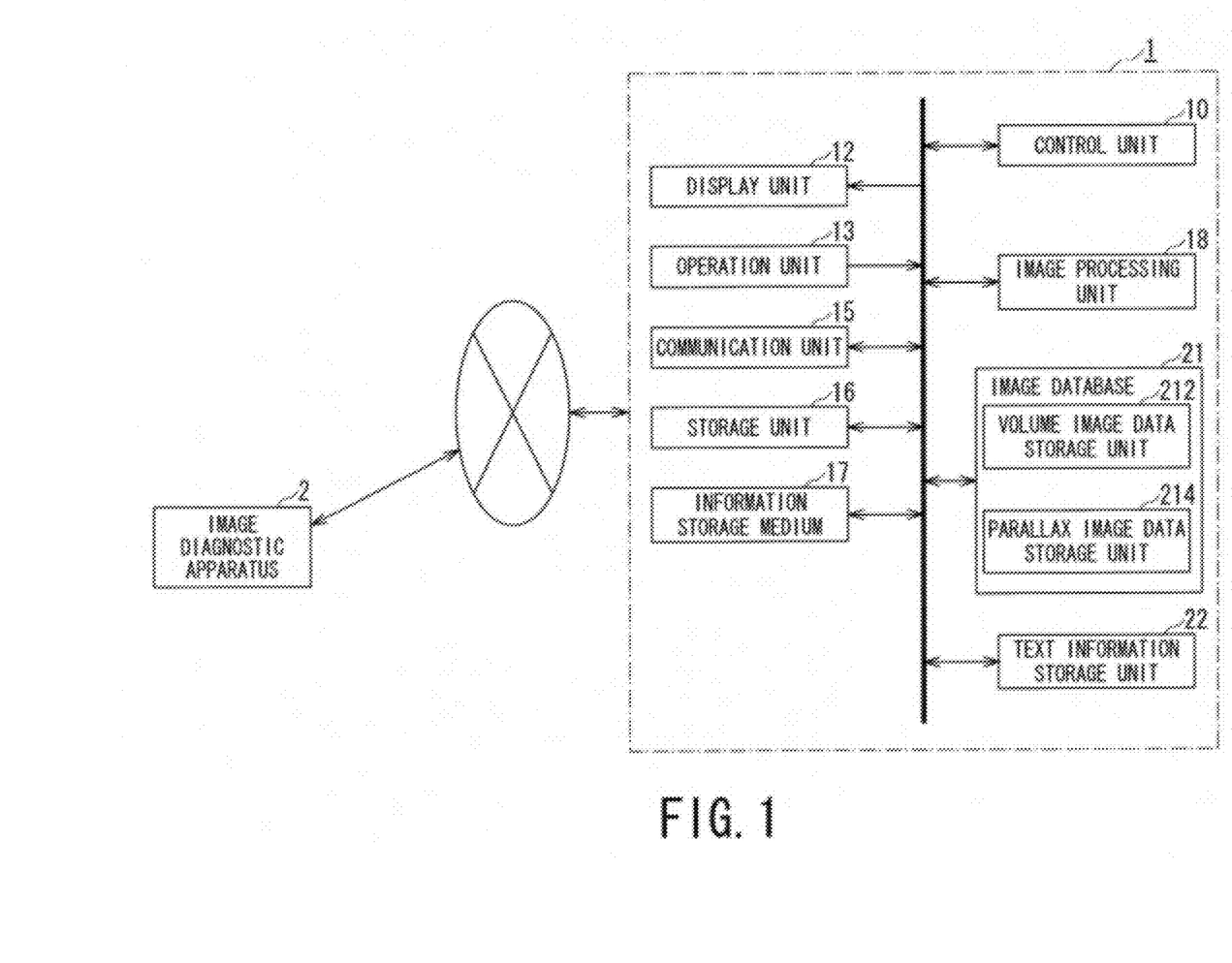
FIG. 1 is a configuration diagram showing a medical image processing apparatus according to an embodiment of the present invention and a network system which interfaces between the medical image processing apparatus and an image diagnostic apparatus.

FIG. 1 is a configuration diagram showing a medical image processing apparatus 1 according to an embodiment of the present invention and a network system which interfaces between the medical image processing apparatus 1 and an image diagnostic apparatus 2. The medical image processing apparatus 1 is connected to another apparatus such as the image diagnostic apparatus 2 such that the apparatuses can communicate with each other over an in-hospital LAN.

The image diagnostic apparatus 2 is a modality such as an X-ray CT scanner. The image diagnostic apparatus 2 radiographs an object and has medical image data.

The medical image processing apparatus 1 includes a control unit 10, a display unit 12, an operation unit 13, a communication unit 15, a storage unit 16 and information storage medium 17, an image processing unit 18, an image database 21, and a text information storage unit 22. The units are connected by buses so as to be capable of communicating with each other.

The operation unit 13 is an input device such as a touch panel or an operation key. The display unit 12 is a monitor or the like and displays multiple parallax images (e.g., nine parallax images) such that the parallax images can be stereoscopically viewed. The display unit 12 is configured so as to change parallax images that are visible to a right eye and a left eye of an observer according to a position where the observer views the display unit 12 (a direction of observation). The communication unit 15 connects to the in-hospital LAN and communicates with the image diagnostic apparatus 2.

The image database 21 includes a volume image data storage unit 212 and a parallax image data storage unit 214. The volume image data storage unit 212 stores volume image data obtained after the image diagnostic apparatus 2 takes an image, and an image processing circuit 182 in the image processing unit 18 performs image processing on the image. A parallax image generation unit 183 performs projection processing corresponding to each of a plurality of parallax directions on a volume image generated based on the volume image data to generate a plurality of parallax image data. Each of the plurality of parallax image data is used as source data of a parallax image. A plurality of parallax images are displayed in respective predetermined parallax directions from the display unit 12 and are recognized as a three-dimensional medical image which is stereoscopically viewable by an operator. The parallax image data storage unit 214 stores the plurality of stereoscopically viewable parallax images generated by the parallax image generation unit 183. Details will be described later.

The text information storage unit 22 stores text information which is acquired by a text information acquisition unit 101 (to be described later).

Figure 2:
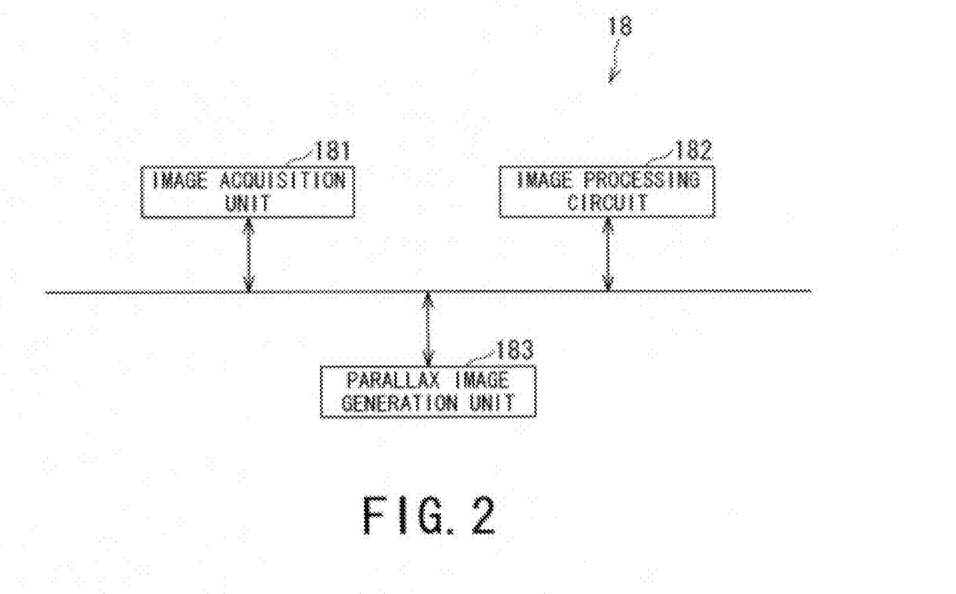
FIG. 2 is a schematic block diagram showing an example of details of an image processing unit.

The image processing unit 18 performs various processes on image data. FIG. 2 shows details of the image processing unit 18. The image processing unit 18 includes an image acquisition unit 181, the image processing circuit 182, and the parallax image generation unit 183.

The image acquisition unit 181 acquires image data taken by the image diagnostic apparatus 2. The image processing circuit 182 performs image processing on the image data acquired by the image acquisition unit 181 to create volume image data. The parallax image generation unit 183 generates pieces of source data of (e.g., nine) different parallax images at a same part, i.e., nine parallax image data, on the basis of the volume image data having undergone the image processing in the image processing circuit 182. As a result, a plurality of parallax images which are perceived as a stereoscopically viewable three-dimensional medical image and a stereoscopically viewable text plane, each based on the three-dimensional medical image data the text information respectively, can be displayed on the display unit 12. The parallax image generation unit 183 also combines volume image data and text information in a three-dimensional image space to generate combined data of volume image data and text information.

The storage unit 16 serves as a work area for the control unit 10, the communication unit 15 and other units and can be embodied by, e.g., a RAM (Random Access Memory).

The information storage medium 17 (computer-readable medium) is intended to store a program, data, and the like and can be embodied by, e.g., a hard disk or a memory (a flash memory or a ROM (Read Only Memory)). A program for causing a computer to function as the units according to the present embodiment (a program for causing the computer to perform processing of the units), a plurality of applications for displaying a three-dimensional medical image, and the like are stored in the information storage medium 17.

The control unit 10 is a calculation unit which performs general control of the medical image processing apparatus 1 and performs other various calculations and control processes. A function of the control unit 10 can be implemented by hardware, such as various processors (e.g., a CPU and a DSP) and an ASIC (e.g., a gate array) or a program. The control unit 10 performs various processes according to the present embodiment on the basis of a program (data) stored in the information storage medium 17.

Figure 3:
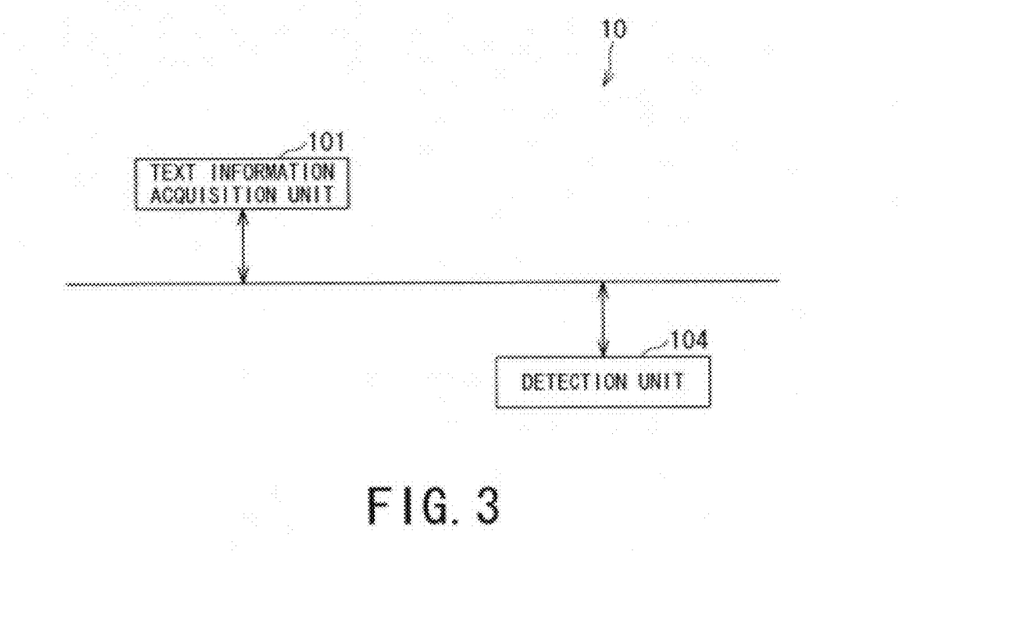
FIG. 3 is a schematic block diagram showing an example of details of a control unit.

FIG. 3 shows details of the control unit 10. The control unit 10 includes the text information acquisition unit 101 and a detection unit 104.

The text information acquisition unit 101 acquires text information indicating details of an image associated with image data obtained through imaging by the image diagnostic apparatus 2 or text information of a UI (User Interface) for operation to be displayed on the display unit 12.

The detection unit 104 detects a position of an observer relative to the display unit 12.

Operation of the medical image processing apparatus with the above-described configuration will be described.

Figure 4:
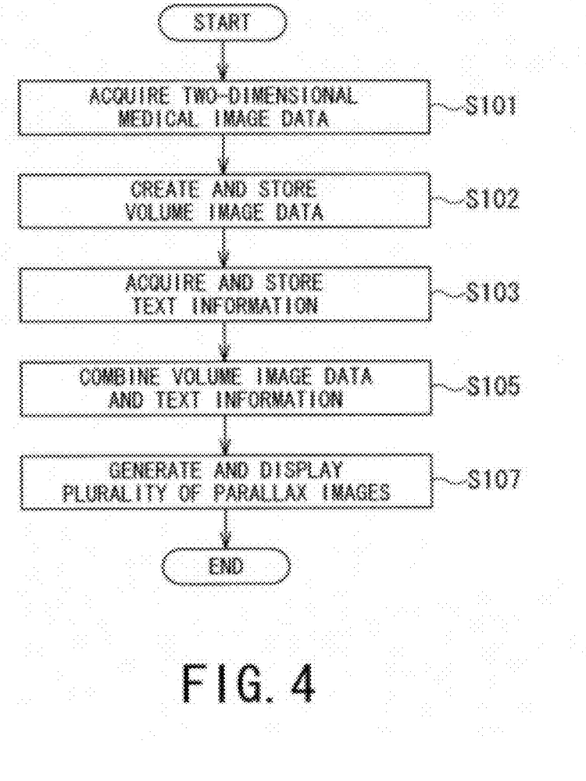
FIG. 4 is a flow chart showing an example of a basic operation of stereoscopically displaying text information.
Figure 5:
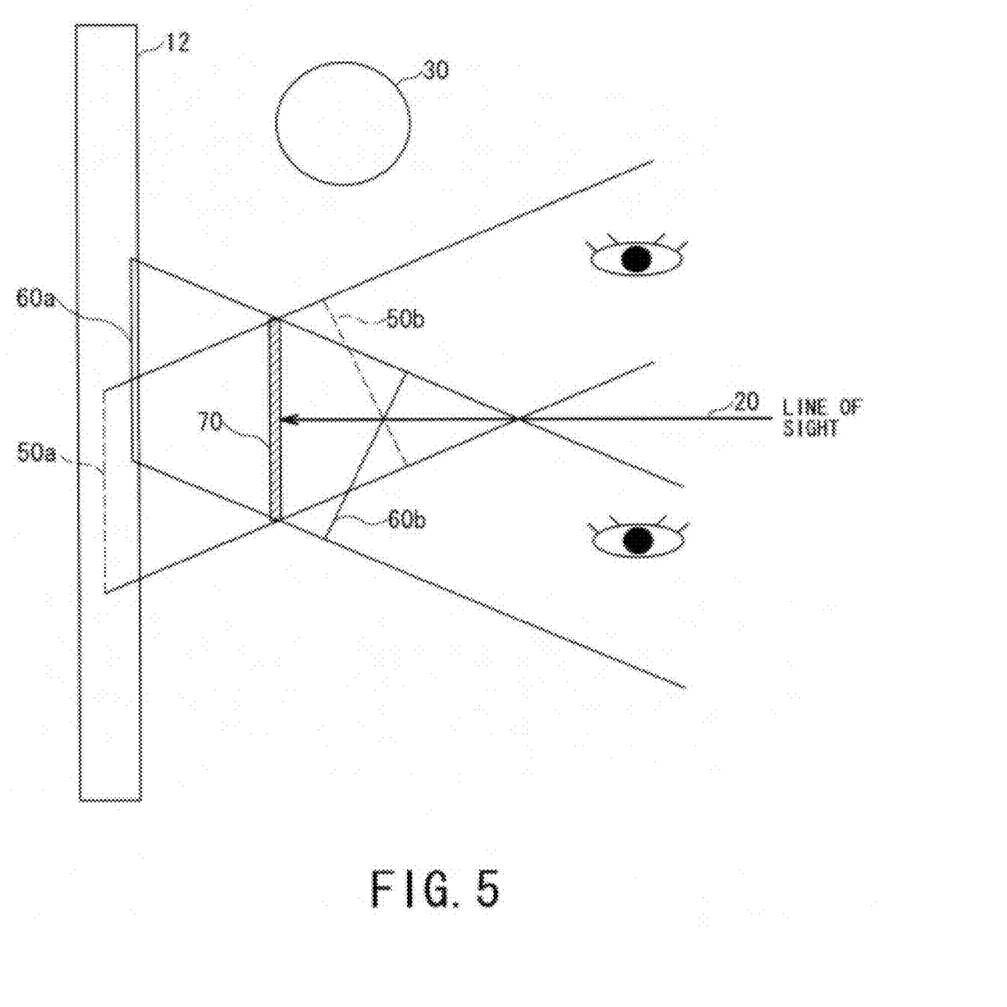
FIG. 5 is a conceptual diagram showing the example of the basic operation of stereoscopically displaying text information.

An example of a basic operation of stereoscopically displaying text information will be described with reference to a flow chart in FIG. 4 and a conceptual diagram in FIG. 5.

The image acquisition unit 181 in the image processing unit 18 acquires two-dimensional medical image data from the image diagnostic apparatus 2 (step S101). The image processing circuit 182 performs image processing on the two-dimensional medical image data to create volume image data and stores the volume image data in the volume image data storage unit 212 (step S102).

The text information acquisition unit 101 in the control unit 10 acquires text information related to the two-dimensional medical image data acquired in step S101 and stores the text information in the text information storage unit 22 (step S103). The text information includes, for example, a report of an examination of a part in the medical image data.

The parallax image generation unit 183 combines the volume data stored in the volume image data storage unit 212 in step S102 with the text information stored in the text information storage unit 22 in step S103 in a three-dimensional image space (step S105).

The parallax image generation unit 183 performs projection processing (rendering) on the volume image data and text information combined in step S105 along parallax directions to generate a plurality of parallax image data (e.g., nine parallax image data corresponding to nine parallax directions) and stores the plurality of parallax image data in the parallax image data storage unit 214. At the same time, the parallax image generation unit 183 causes the display unit 12 to display a plurality of parallax images based on the plurality of parallax image data in respective predetermined parallax directions (step S107). The parallax image generation unit 183 performs the projection processing after changing orientation of a display region for the text information according to the parallax direction corresponding to each parallax image, creates a text plane 70 which is perceived stereoscopically viewable by the observer, and displays the text plane 70 on the display unit 12.

Text information in FIG. 5 will be described. The stereoscopically viewable text plane 70 is created by using, as parallax images, text planes (a text plane 50*b* for a right eye and a text plane 60*b* for a left eye) corresponding to (e.g., perpendicular to) eye directions of a right eye and a left eye of an observer facing toward text regions 50*a* and 60*a* and is displayed on the display unit 12. At this time, it seems to the observer that a three-dimensional medical image 30 and the text plane 70 are displayed on a predetermined plane at a position in front of a display surface of the display unit 12. The text plane 70 is perpendicular to, for example, a line 20 of sight of the observer. Note that orientations of the text plane 70 for the nine parallax images need not be different from each other. For example, respective orientations may be set for three directions such as a right-hand direction, a front direction, and a left-hand direction, each of which corresponds to a plurality of parallax images.

This allows display of text information which faces an observer squarely and is stereoscopically viewable.

Note that the detection unit 104 may detect a position of an observer (a direction of observation) and create a text plane on the basis of the detected direction of observation.

Figure 6:
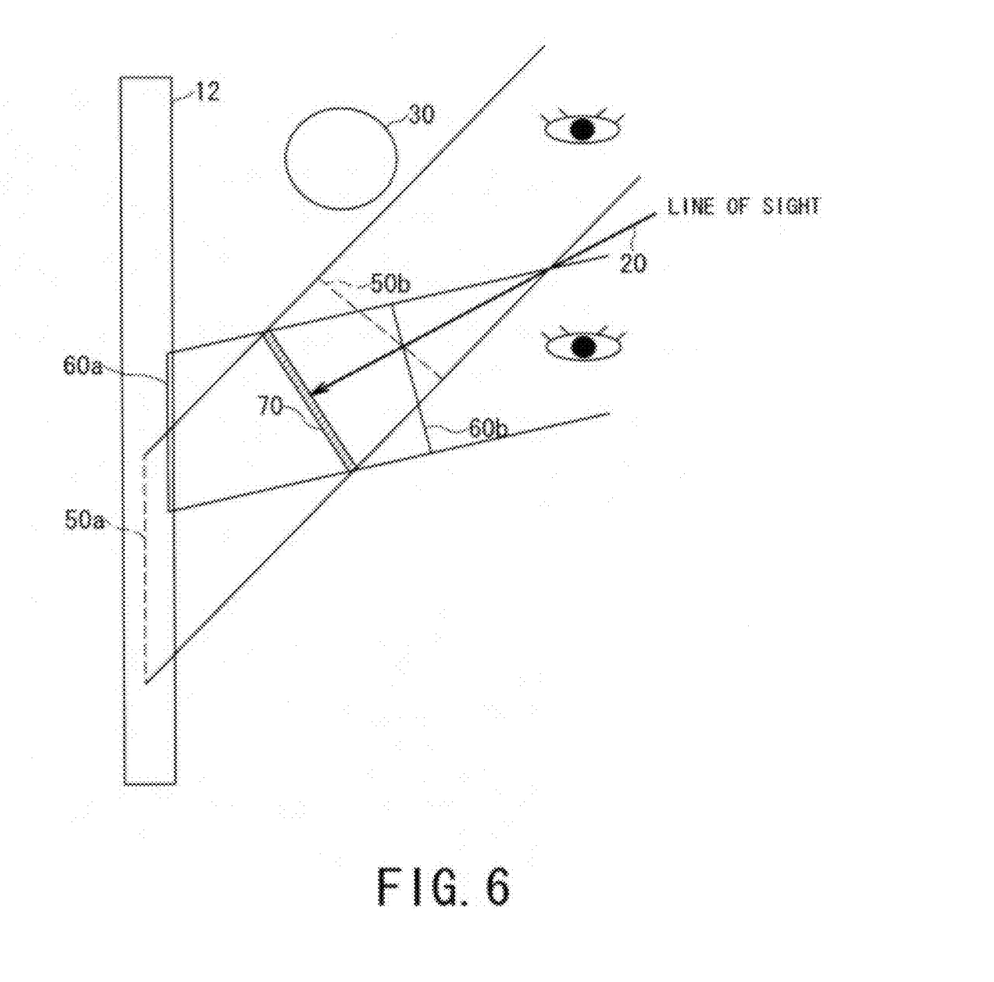
FIG. 6 is a conceptual diagram showing how text information is stereoscopically displayed when an observer observes at an arbitrary angle with respect to a display unit.

FIG. 6 shows a conceptual diagram of stereoscopic display of text information when an observer observes at an arbitrary angle with respect to the display unit 12. In the case of FIG. 6, the stereoscopically viewable text plane 70 is created by using, as parallax images, the text planes 50*b* and 60*b* corresponding to eye directions of eyes of the observer facing toward the text regions 50*a* and 60*a*, as in FIG. 5. The created text plane 70 is perpendicular to, for example, the line 20 of sight of the observer and forms a predetermined angle with the display unit 12.

With this configuration, even if a direction in which the observer views changes, text information which faces an observer squarely and is stereoscopically viewable can be displayed.

Figure 7:
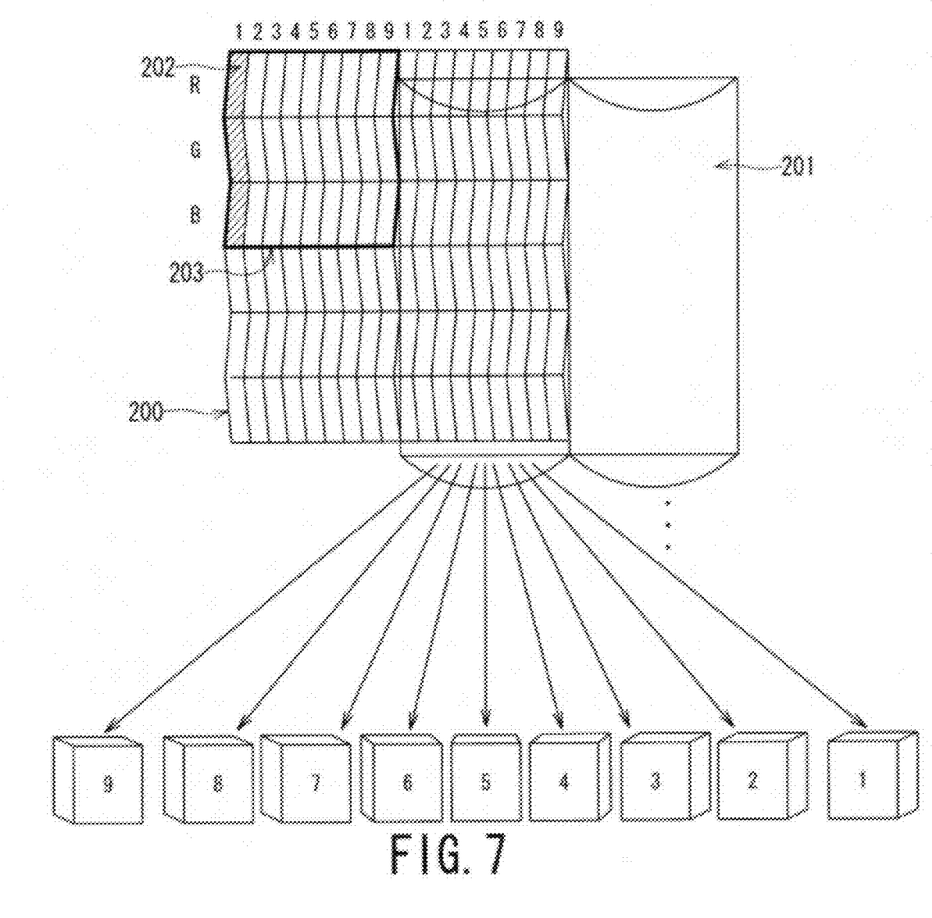
FIG. 7 is a diagram showing an example of stereoscopic display using nine parallax images.
Figure 8A:
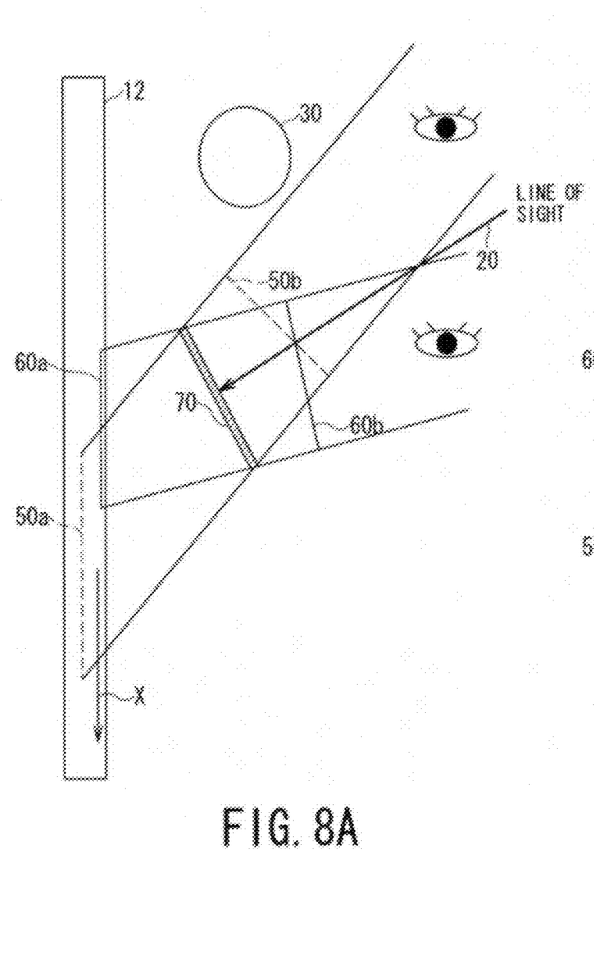
Figure 8B:
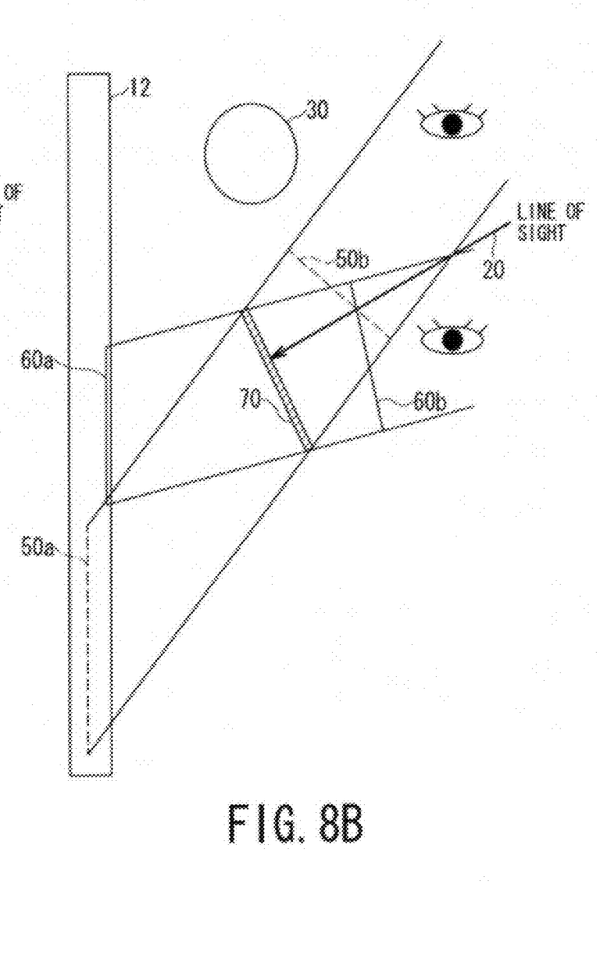

FIG. 7 shows an example of the display unit 12 that performs stereoscopic display with use of nine parallax images. The display unit 12 includes a light direction controller arranged at a front of a planar display surface 200 such as a liquid crystal panel. For example, in the display unit 12, a perpendicular lenticular sheet 201 as a light direction controller whose optical aperture extends in a perpendicular direction is attached to a front surface of the display surface 200. Note that although the perpendicular lenticular sheet 201 is attached in the example shown in FIG. 7 such that projecting units of the perpendicular lenticular sheet 201 serve as a front surface, the perpendicular lenticular sheet 201 may be attached such that the projecting units face toward the display surface 200.

As shown in FIG. 7, pixels 202, each having an aspect ratio of 3:1 and including three sub-pixels (red (R), green (G), and blue (B)) arranged in a longitudinal direction, are arranged in a matrix at the display surface 200. The display unit 12 converts nine parallax images composed of nine images into an intermediate image including images arranged in a predetermined format (e.g., tiled) and outputs the intermediate image to the display surface 200. More specifically, the display unit 12 assigns nine pixels at same positions of the nine parallax images to a row of nine pixels 202 and causes the row of nine pixels 202 to output the respective assigned pixels. The row of nine pixels 202 serve as a unit pixel group 203 which simultaneously displays nine images with different parallactic angles.

The nine parallax images which are simultaneously output as the unit pixel groups 203 at the display surface 200 are emitted as parallel light beams by, for example, an LED (Light Emitting Diode) backlight and are further emitted in multiple directions by the perpendicular lenticular sheet 201. Since light beams at each pixel of the nine parallax images are emitted in multiple directions, light beams incident on a right eye and a left eye of an observer change in tandem with a position of the observer (a position of a viewpoint). That is, a parallactic angle of an image incident on the right eye and an image incident on the left eye varies according to an angle at which the observer views. This allows an observer to stereoscopically and visually recognize an object to be imaged at each of, e.g., nine positions. As can be seen from FIG. 7, an observer can stereoscopically and visually recognize an object to be imaged at, e.g., position "5" while facing the object to be imaged squarely and can stereoscopically and visually recognize the object to be imaged at each of the positions other than position "5" while orientation of the object to be imaged is changed.

A method for setting the text regions set in step S107 is not limited to the above-described setting, and various setting methods may be used depending on circumstances. Setting methods will be specifically described as modifications below.

FIGS. 8A and 8B show an example in which the stereoscopically viewable text plane 70 is created on a plane close to a stereoscopic display plane for the three-dimensional medical image 30. In FIG. 8A, it seems to an observer that a plane on which the text plane 70 is stereoscopically displayed is farther than a plane on which the three-dimensional medical image 30 is stereoscopically displayed. The parallax image generation unit 183 shifts the text region 50*a* for a right eye in a direction of an arrow X to change a position of the text plane 50*b* for a right eye, as shown in FIG. 8B. The text plane 70 is created on a plane identical to or close to a display plane for the three-dimensional medical image 30 by using the changed text plane 50b for a right eye and the text plane 60b for a left eye as parallax images.

This allows an observer to observe a three-dimensional medical image and related text information in substantially same display spaces without discomfort.

Figure 9A:
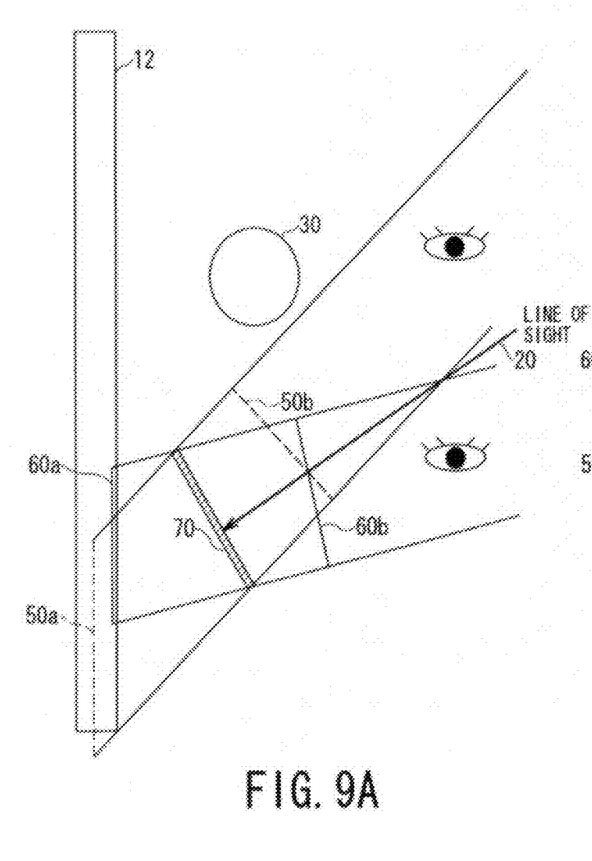
FIG. 9A is a diagram showing an example in which a part of text regions which falls outside a display range of the display unit.
Figure 9B:
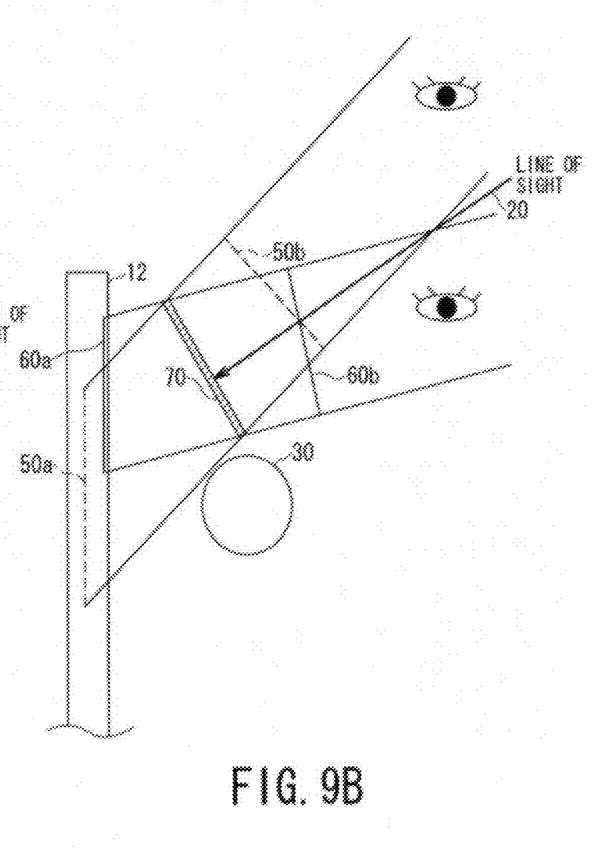
FIG. 9B is a diagram showing an example in which the text regions are set within the display range of the display unit.
Figure 10:
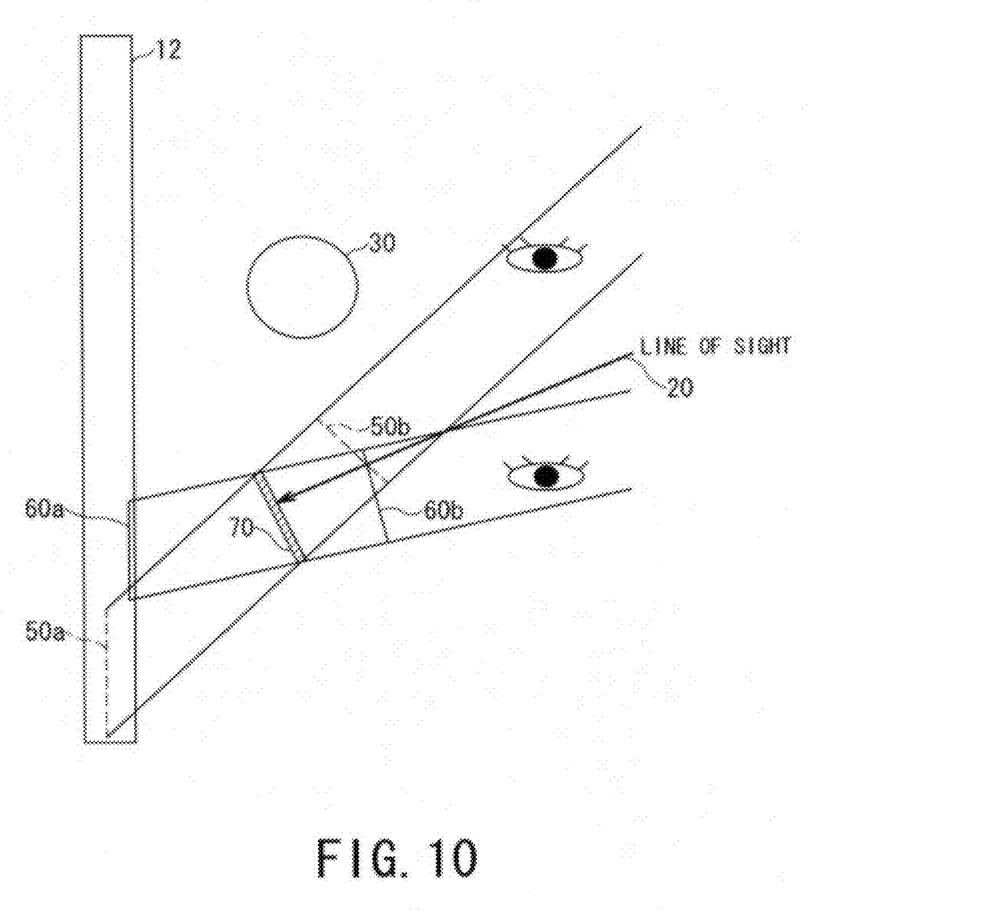
FIG. 10 is a diagram showing an example in which the text regions have narrower region widths.

FIGS. 9A and 9B and 10 show an example in which a part of text regions falls outside a display range of the display unit 12. Referring to FIG. 9A, if a position where the three-dimensional medical image 30 is stereoscopically displayed is in front of an eye of an observer, the parallax image generation unit 183 shifts text regions to, e.g., a left-eye side (a lower side in FIG. 9A) of the display unit 12 such that the position where the three-dimensional medical image 30 is displayed is not in an eye direction of the observer. However, if the position where the three-dimensional medical image 30 is stereoscopically displayed is on a left side of a center of the display unit 12 in this case, the text regions are set on a left side of the display unit 12, and a part of the regions may fall outside the display range of the display unit 12.

For this reason, as shown in FIG. 9B, the text regions 50a and 60a are set again at positions within the display range of the display unit 12 on a right side (an upper side in FIG. 9B) of the three-dimensional medical image. At this time, the observer shifts to a right side of the display unit 12 such that an angle which the eye direction of the observer forms with the text plane 70 remains same.

This prevents a text region from falling outside a display range to cause non-display of a part of text information.

Alternatively, as shown in FIG. 10, region widths of the text regions 50a and 60a are made narrower than those in FIG. 9A so as to prevent the text regions 50a and 60a from falling outside the display range of the display unit 12.

Text in a text region with a narrower display range can be displayed by changing a position where a character string wraps around (e.g., transforming the character string displayed in two lines into three lines).

Figure 11:
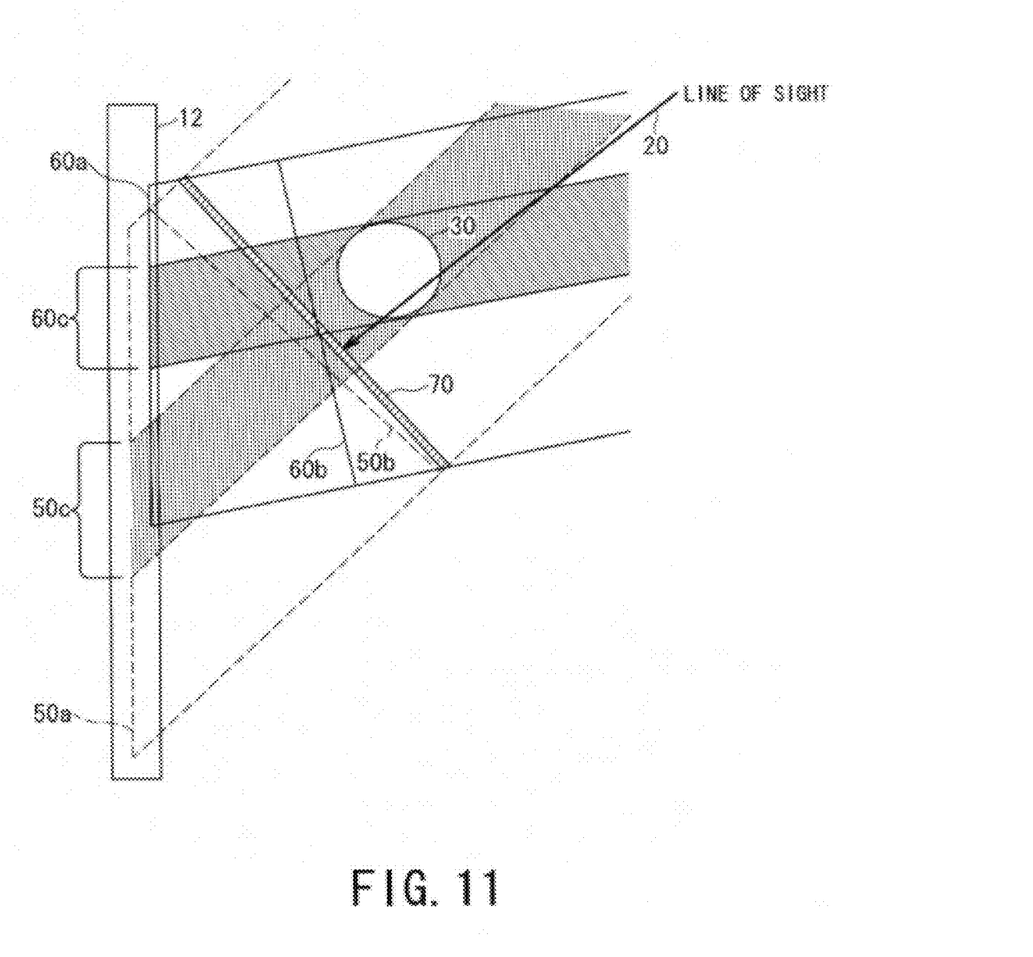
FIG. 11 is a diagram showing an example in which the three-dimensional medical image and the text regions overlap.
Figure 12A:
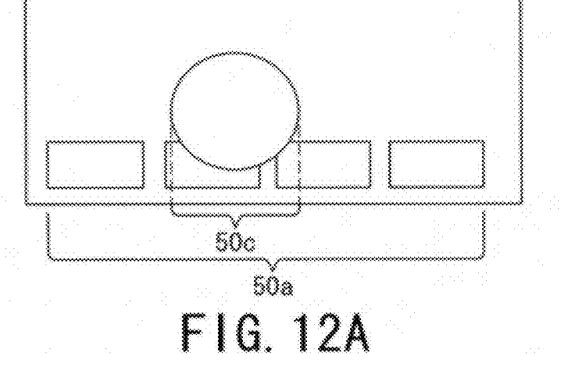
FIG. 12A is a diagram showing an example of a parallax image for a right eye when the three-dimensional medical image and the text regions overlap.
Figure 12B:
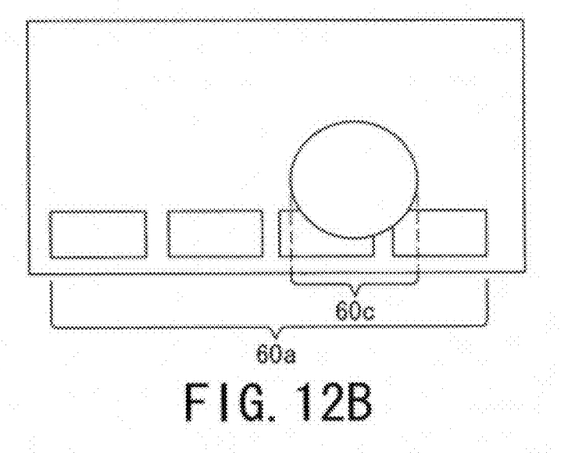
FIG. 12B is a diagram showing an example of a parallax image for a left eye when the three-dimensional medical image and the text regions overlap.
Figure 12C:
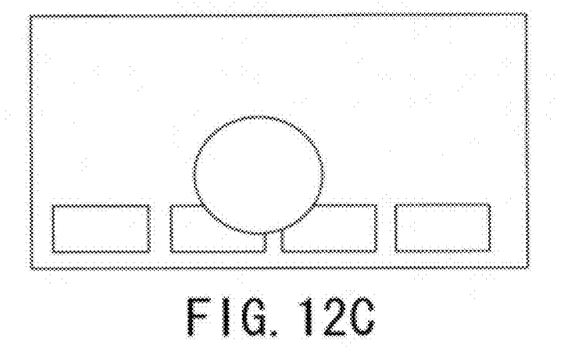
FIG. 12C is a diagram showing an example of a stereoscopic image for both the eyes when the three-dimensional medical image and the text regions overlap.

FIG. 11 shows an example in which text information is an operation panel or an operation button and a three-dimensional medical image and text regions overlap with each other. FIGS. 12A to 12C show examples of images. In this case, text regions constitute a large unit of the display unit 12, unlike the other examples described above.

Referring to FIG. 11, when the text plane 70 is created by using the text plane 50b for a right eye and the text plane 60b for a left eye as parallax images, hatched units overlap with a display position of a three-dimensional medical image. The parallax image generation unit 183 does not set text regions for text regions 50c and 60c corresponding to the hatched units and preferentially displays the three-dimensional medical image 30.

FIGS. 12A to 12C show examples of images which are visible from an observer at this time. In FIGS. 12A to 12C, text information is four operation buttons. FIG. 12A is a parallax image for a right eye, FIG. 12B is a parallax image for a left eye, and FIG. 12C is a stereoscopic image for both the eyes. In each of the text regions 50c and 60c which overlaps partially with the three-dimensional medical image 30, the three-dimensional medical image is displayed instead of a part of operation buttons.

With this configuration, overlapping display of a three-dimensional image and an operation button due to overlap between display positions can be prevented, and the three-dimensional medical image can be displayed in front.

According to the above-described embodiment, volume image data and text information corresponding to the volume image data are acquired and are combined in a three-dimensional image space. Projection processing is performed on the combined volume image data and text information along parallax directions to generate and display a plurality of parallax images. At this time, the projection processing is performed after changing orientation of a display region for the text information according to a parallax direction of each parallax image to create a stereoscopically viewable text plane and display the text plane on a 3D monitor. For this reason, even if a direction in which an observer views changes in a medical image processing apparatus, a text plane is displayed on the 3D monitor such that the text plane always faces the observer substantially squarely, which improves visibility of text information.

While certain embodiments have been described, these embodiments have been presented by way of example only, and are not intended to limit the scope of the inventions. Indeed, the novel apparatuses described herein may be embodied in a variety of other forms; furthermore, various omissions, substitutions and changes in the form of the apparatuses described herein may be made without departing from the spirit of the inventions. The accompanying claims and their equivalents are intended to cover such forms or modifications as would fall within the scope and spirit of the inventions.

What is claimed is:

1. A medical image processing apparatus comprising:
an image storage unit configured to store three-dimensional medical image data;
a text information storage unit configured to store text information corresponding to the three-dimensional medical image data stored in the image storage unit;
a parallax image generation unit configured to generate combined data of the three-dimensional medical image data and the text information, and configured to generate a plurality of parallax image data by executing volume rendering on the combined data along a corresponding plurality of parallax directions, each parallax direction being along a line of sight from a predetermined view point the parallax image generation unit changing orientation of a display region for the text information in the combined data such that a text plane on which the text information is displayed is perpendicular to a corresponding parallax direction; and
a display unit configured to display a plurality of parallax images, based on the plurality of the parallax image data, in the corresponding plurality of parallax directions such that a three-dimensional medical image based on the three-dimensional medical image data and a text plane based on the text information are perceived stereoscopically viewable by an observer and such that the text plane is perpendicular to the corresponding parallax direction.

2. The medical image processing apparatus according to claim 1, wherein the parallax image generation unit creates the text plane such that the text plane is displayed at a position, in an eye direction of the observer, approximately identical to a position where a plane on which the observer perceives the three-dimensional medical image is displayed.

3. The medical image processing apparatus according to claim 1, wherein when at least a part of the display region for the text information falls outside a display range of the display unit, the parallax image generation unit sets again the display region for the text information within the display range of the display unit such that a display position of the three-dimensional medical image and the text plane are displayed so as not to overlap each other in an eye direction of the observer.

4. The medical image processing apparatus according to claim 1, wherein when at least a part of the display region for the text information falls outside the display range of the display unit, the parallax image generation unit narrows widths of a plurality of display regions and sets again the display region for the text information again.

5. The medical image processing apparatus according to claim 2, wherein when the three-dimensional medical image and the text plane are displayed so as to overlap with each other, the parallax image generation unit generates the combined data such that a part of the combined data corresponding to a display region for a part of the text information which overlaps with the three-dimensional medical image data is consists solely of the three-dimensional medical image data.

6. The medical image processing apparatus according to claim 1, further comprising a detector configured to detect a position of the observer, wherein the parallax image generation unit changes orientation of the display region for the text information in generating the combined data according to the position of the observer.

* * * * *